C. F. Anderson.
Grain Drill.
Nº 19,902. Patented Apr. 13, 1868.
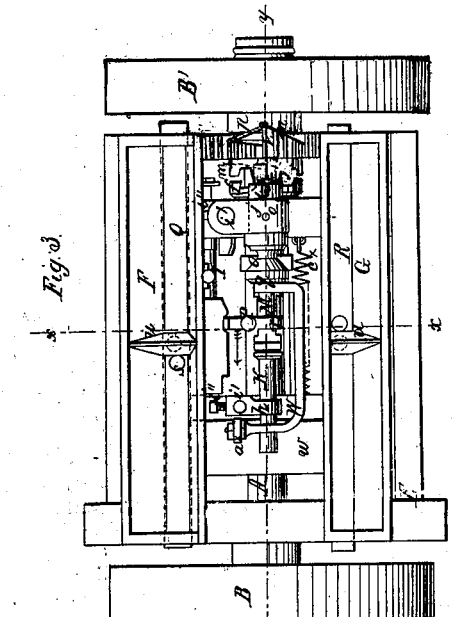
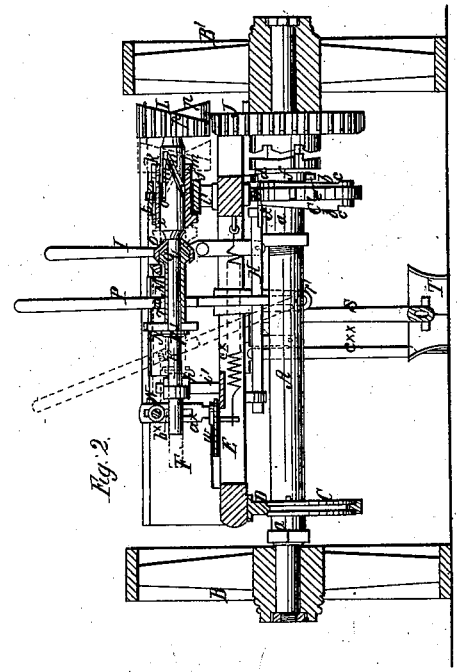
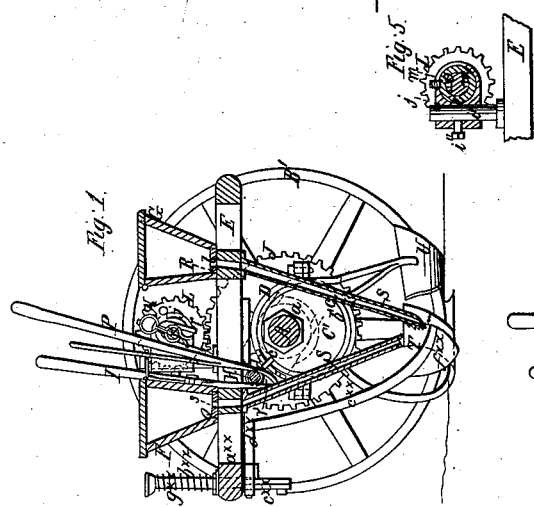
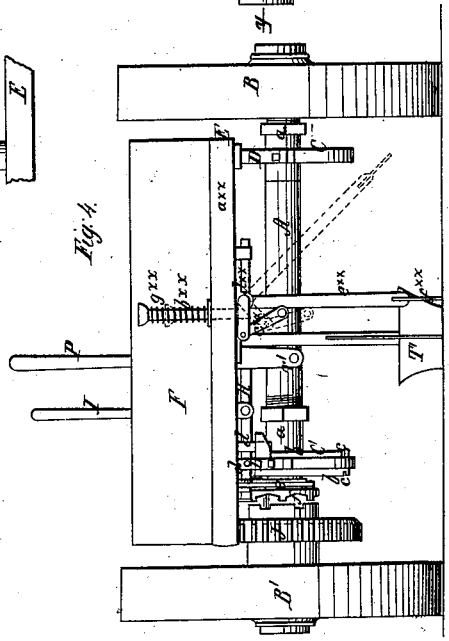

UNITED STATES PATENT OFFICE.

CHAS. F. ANDERSON, OF CHARLESTOWN, NEW HAMPSHIRE.

IMPROVEMENT IN SEEDING-MACHINES.

Specification forming part of Letters Patent No. 19,902, dated April 13, 1858.

*To all whom it may concern:*

Be it known that I, CHARLES F. ANDERSON, of Charlestown, in the county of Sullivan and State of New Hampshire, have invented a new and Improved Seeding-Machine; and I do hereby declare that the following is a full, clear, and exact description of the same, reference being had to the annexed drawings, making a part of this specification, in which—

Figure 1 is a side sectional elevation of my improvement, taken in the line $xx$, Fig. 3. Fig. 2 is also a vertical section of the same, taken in the line $yy$, Fig. 3. Fig. 3 is a plan or top view of the same. Fig. 4 is a front view of the same. Fig. 5 is a detached vertical section of one of the bearings of the shaft which communicates motion from the driving-wheel to the seed-slides.

Similar letters of reference indicate corresponding parts in the several figures.

This invention relates to an improvement in that class of seeding-machines in which two distributing devices are combined for the purpose of distributing different kinds of seeds with one and the same driving mechanism; and the invention also relates to a peculiar device for marking the hills at certain points, and to a novel arrangement of means for elevating the body of the machine, so that the seed-conveying tubes and shares may be readily elevated free from the ground while the machine is being drawn from place to place, or at any time when the distribution or planting of the seed is not required while the machine is in motion, as in turning at the ends of rows, &c.

To enable those skilled in the art to fully understand and construct my invention, I will proceed to describe it.

A represents an axle, and B B' are wheels which are placed loosely on the ends thereof.

C C' are eccentrics, which are placed on the axle, one near each end, and are secured thereon by jam-nuts $a$ $a$. The eccentrics C C' are encompassed by straps D D, one to each, and these straps are attached to the under side of a rectangular frame, E, which carries two seed-boxes, F G, and also the mechanism by which the seed-slides are operated. The eccentric C' is provided with a flange, $b$, at each side, said flanges being of double-cam or oblique shape, so as to form shoulders $c$, two at each side of the eccentric and at opposite points of its circumference.

H is a slide-rod, fitted in suitable bearings at the under side of the frame E, and operated by a lever, I. On the rod H two pendants, $d$ $d$, are placed, a pendant being at each side of the eccentric C', and on the outer end of the rod H a pendent fork, $e$, is fitted, said fork encompassing a catch, $f$, which, when desired, engages, by adjusting the rod H, the axle A with the wheel B.

On the inner end of the hub of the wheel B' a spur-wheel, J, is placed, and on the frame E, between the two seed-boxes F G and parallel with them, a shaft, K, is placed. One end of this shaft is fitted in a bearing, $h$, attached to the frame E, and the opposite end is fitted in a tube or collar, $i$, which is fitted in a bearing, $j$, attached to the frame. Both bearings $h$ $j$ are fitted on vertical rods $i'$ $i'$, attached to the frame E, and the bearings are allowed to slide freely up and down on said rods, and are secured at any desired points by set-screws $i''$. The tube or collar $i$ is allowed to slide longitudinally to a certain extent in its bearing $j$, but is prevented from turning therein by means of a feather, $k$, which works in a groove, $l$, in the bearing. (See Fig. 2.) The portion of the shaft K that is fitted within the tube or collar $i$ has a zigzag groove made in it, as shown in Fig. 2. The portions $m$ $m$ of the groove are parallel with the shaft K; but the portions $n$ $n$ are of spiral or screw form, and communicate with the portions $m$ $m$ at opposite ends, so as to form a continuous groove. This will be clearly understood by referring to Fig. 2. From the inner side of the tube or collar $i$ a pin, $o$, projects, said pin fitting in the zigzag groove.

To the end of the shaft K a pinion, L, is placed. This pinion has its outer edge formed of two oblique portions, $p$ $p$. (See Figs. 2 and 3.) On the shaft K a collar, M, is placed loosely, and is allowed a certain degree of play or movement thereon when a stop, N, is removed. This stop is constructed similar to a spring-clamp. It grasps the shaft K, and is retained thereon by its own elasticity, the stop being fitted between one end of the collar M and a shoulder, $p'$, on the shaft K. A conical boss or shell, O, is also placed on the shaft K to receive one end of the collar M, which at said end is of conical or taper form and of increased diameter, as shown more particularly at $q$, Fig. 2. The collar M is encompassed by a loop, $r$, which is attached to a lever, P, the lower end of said lever being pivoted to a pendant, $r'$, of the framing. (See Figs. 1, 2, and 4.)

At the bottom of the seed-box F a slide, Q, is placed. This slide has an aperture, $s$, made through it near its center. At the bottom of the seed-box G a similar slide, R, is fitted, which also has an aperture, $t$, made through it near its center. Both seed-boxes F G have a guard or partition, $u$, at their center, said guards covering the orifices of conveying-tubes S S, the lower ends of which are connected, as shown clearly in Fig. 1. To the tubes S a furrow-share, T, and covering-share U are attached, as shown clearly in Fig. 1. The two slides Q R are connected by a cross-plate, $w$, and to this plate a standard, $a^x$, is attached, said standard having one end of a curved rod, W, attached to it by passing through a slot, $b^x$, made therein, so that the rod may rise and fall, the opposite end of the rod resting on the collar M and bearing against the boss or shell O.

Through the front cross-piece, $a^{xx}$, of the frame E a vertical spindle, $b^{xx}$, passes, and the lower end of this spindle is connected by a link, $c^{xx}$, with a horizontal shaft, $d^{xx}$, the bearings of which are secured to the under side of frame E. To the inner end of the shaft $d^{xx}$ a vertical rod, $e^{xx}$, is attached, and a blade or scraper, $f^{xx}$, is attached to the lower end of the rod $e^{xx}$, the blade or scraper penetrating the ground a suitable depth. A spiral spring, $g^{xx}$, is placed on the spindle $b^{xx}$, said spring having a tendency to keep the blade or scraper $f^{xx}$ by the side of the share T.

The operation is as follows: As the machine is drawn along the spur-wheel J rotates the shaft K through the medium of the pinion L, and the shaft K has a longitudinal vibratory movement given it, as well as a rotary one, by means of the zigzag slot in the shaft, in connection with a spring, $c^x$, attached to the cross-plate $w$ of the slides F G. The spiral portions $n$ $n$ of the zigzag groove, in consequence of acting against the pin $o$ of the tube $i$, throws the shaft K inward, and when the outer ends of said portions $n$ of the groove reach the pin $o$ the shaft K is thrown back to its original position by the spring $c^x$, the parts $m$ of the zigzag groove allowing the shaft to return directly back. In consequence of the double-oblique form of the outer side of the pinion L, said pinion at every semi-revolution passes out of gear with the wheel J, and the shaft K is allowed to return freely back to its original position without causing any binding of the gearing L J—a contingency likely to occur if provision were not made to prevent it, as the shaft K cannot turn when the pin $o$ is in either of the grooves $m$. The longitudinal movement of the shaft K gives the reciprocating movement to the slides Q R through the medium of the rod W, which serves as a latch, and when it is designed to stop the slides Q R the stop N is withdrawn from the shaft K and the lever P moved in the direction of the arrow, (see Fig. 3,) and the collar M will raise the rod or latch above the enlarged portion $q$ of the collar M, and the spring $c^x$ will throw the end of the latch or rod over the boss or shell O, and the slides will be stopped. The pinion L will also at the same time be thrown out of gear with the wheel J, and the necessary longitudinal movement of the shaft K—necessary to effect this—is obtained at any time, irrespective of the position of the zigzag slot and pin $o$ by means of the sliding collar $i$.

By means of the rod or latch W, operated as shown, the slides Q R are allowed to be thrown back by the spring $c^x$, when the pinion L is out of gear with wheel J, and the aperture in slide Q will be thrown under the guard $u$, forming a perfect and quick-acting cut-off. The slide Q, it will be understood, distributes the corn or other seed which is planted in hills, and the apertures of the two slides Q R distribute their seed respectively at opposite sides of the guards $u$. The slide R will distribute its seed in almost a continuous stream, as the seed is distributed as the shaft K is moved outward from the wheel B', and this movement is slow compared with the return movement given it by the spring $c^x$, and as the seed in hopper F is distributed during the quick backward movement of the shaft K it follows, as a matter of course, that the latter slide will distribute the seed in hills.

The conveying-tubes S and shares T U may be raised free from the ground at any time by operating the lever I so that the clutch $f$ may connect the axle A with the wheel B'. The axle will then rotate with the wheel B', and the eccentrics C C' will raise the frame E, one-half of a revolution of the eccentrics elevating the frame to its highest position. The shoulders $c$ $c$ on the flanges $b$ $b$ of the eccentrics serve as stops and arrest the rotation of the eccentrics at each half-revolution and at the two points of adjustment of the frame. The shares may also be retained at any desired height by varying the position of the eccentrics on the axle A. In commencing each row the position of the first hills planted are designated or marked by depressing the spindle $b^{xx}$, by which the blade or scraper $f^{xx}$ is operated or thrown outward, so as to leave a depression or mark distinctly visible to serve as a guide at the commencement of the succeeding row, thereby insuring the perfect planting of seed in check-rows.

Having thus described my invention, what I claim as new, and desire to secure by Letters Patent, is—

1. Actuating the seed-slides Q R by means of the shaft K, operated from the wheel B' by the spur-wheel J, pinion L, beveled or made of double-oblique form on its outer side, the tube or collar $i$, provided with the pin $o$, and the zigzag groove in the shaft K and the spring $c^x$, the above parts being arranged to operate as and for the purpose set forth.

2. The latch or catch W, connected with the slides Q R, and used in connection with the sliding collar M and the boss or shell O on shaft K, substantially as and for the purpose set forth.

3. The blade or scraper $f^{\times\times}$, attached to the rod $e^{\times\times}$, and actuated, when desired, by means of the spindle $b^{\times\times}$, shaft $d^{\times\times}$, and link $c^{\times\times}$ and spring $g^{\times\times}$, substantially as and for the purpose specified.

4. Raising and lowering the frame E of the machine by means of the eccentrics C C′, attached to the axle A, in connection with the straps D D and clutch $f$, substantially as and for the purpose herein specified.

CHARLES F. ANDERSON.

Witnesses:
 HENRY HUBBARD,
 LOUISE WEST.